Patented June 18, 1946

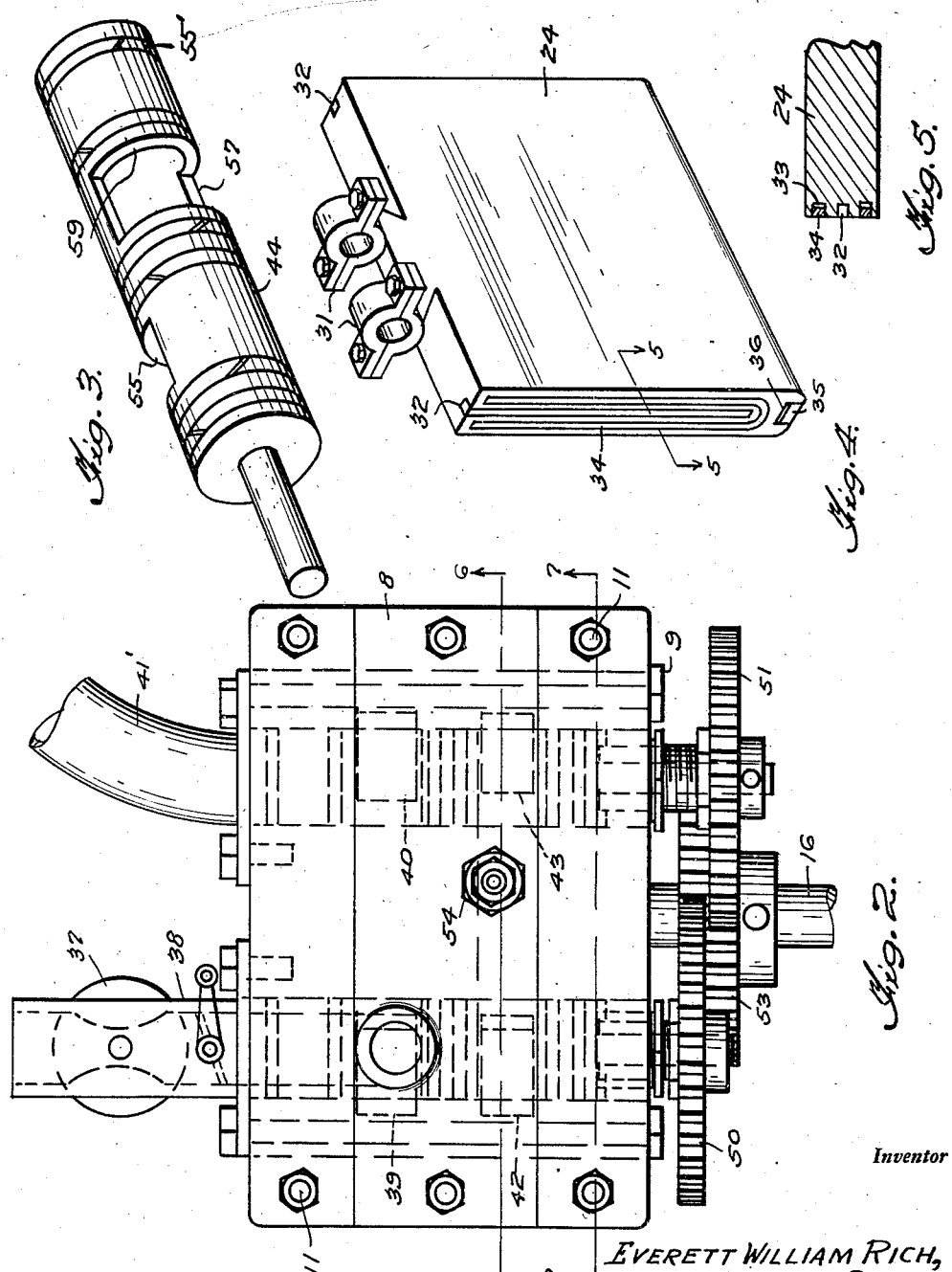

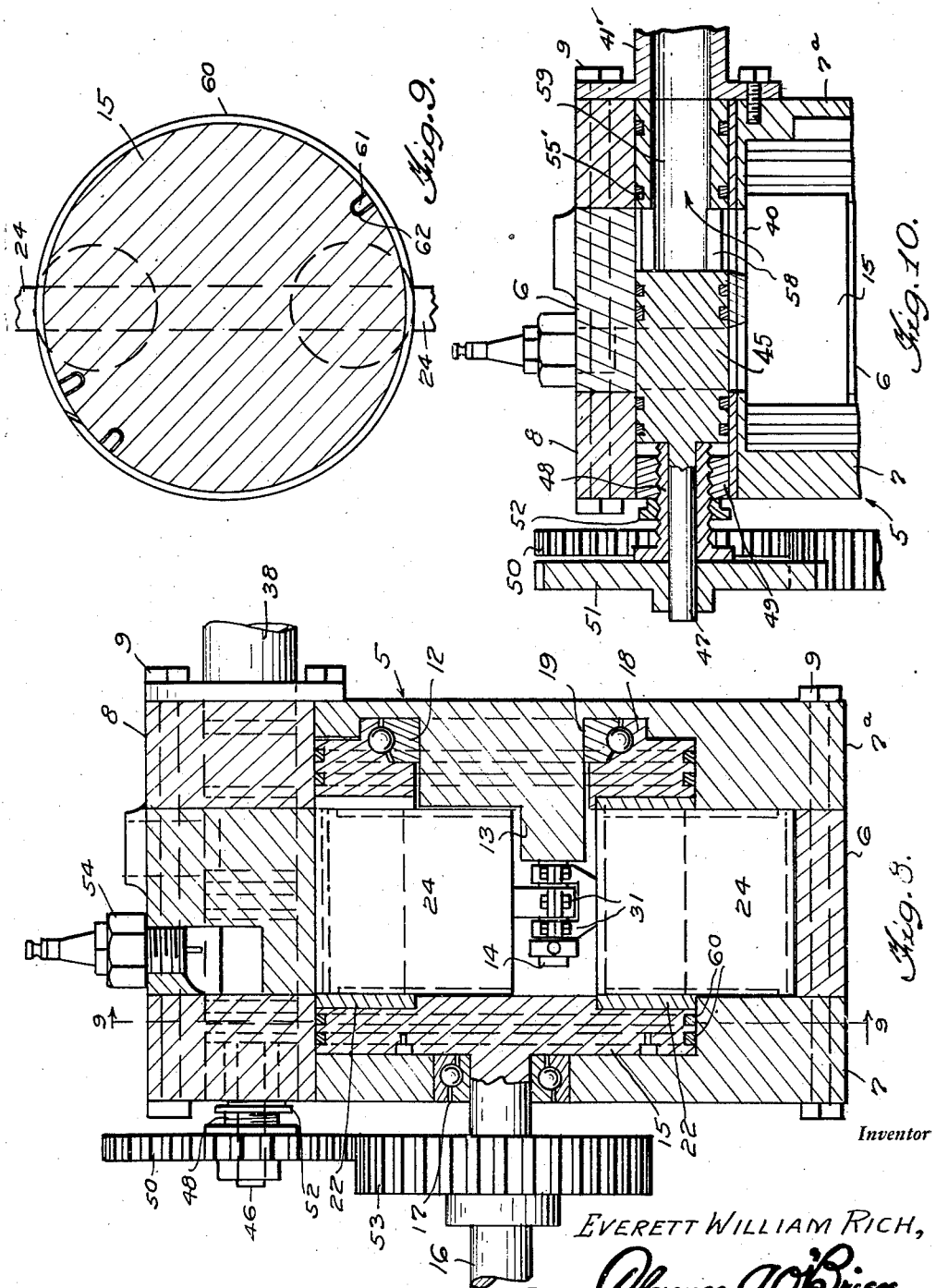

2,402,257

UNITED STATES PATENT OFFICE 2,402,257

ROTARY COMBUSTION ENGINE

Everett William Rich, San Diego, Calif.

Application August 7, 1944, Serial No. 548,437

1 Claim. (Cl. 123—16)

This invention relates to new and useful improvements in rotary combustion engines of the type disclosed in my co-pending application Serial No. 493,453, filed July 3, 1943.

An important object of the present invention is to simplify and improve rotary engines of the above kind by providing a novel arrangement of rotary valves for controlling the supply of explosive charges to the power and pump chamber for compression; for controlling the passage of the compressed charges from the power and pump chamber to the combustion chamber of the engine head; for controlling the passage of the expanding fired gases from the combustion chamber to the power and pump chamber for driving the piston of the engine; and for controlling the exhaust of spent or expanded gases from the power and pump chamber to the exhaust pipe leading from the engine.

A further object of the invention is to provide, in an engine of the above kind, a novel and efficient construction of piston and radially movable vanes.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 2 is a top plan view thereof drawn on a smaller scale.

Figure 3 is a perspective view of one of the rotary valves.

Figure 4 is a perspective view of one of the radially movable vanes.

Figure 5 is a fragmentary section taken substantially on line 5—5 of Figure 4.

Figure 8 is a view taken substantially on line 8—8 of Figure 1 and drawn on a smaller scale.

Figure 9 is a sectional view through the piston taken on the plane of line 9—9 of Figure 8.

Figure 10 is a fragmentary vertical section taken substantially on line 10—10 of Figure 1.

Figure 1:
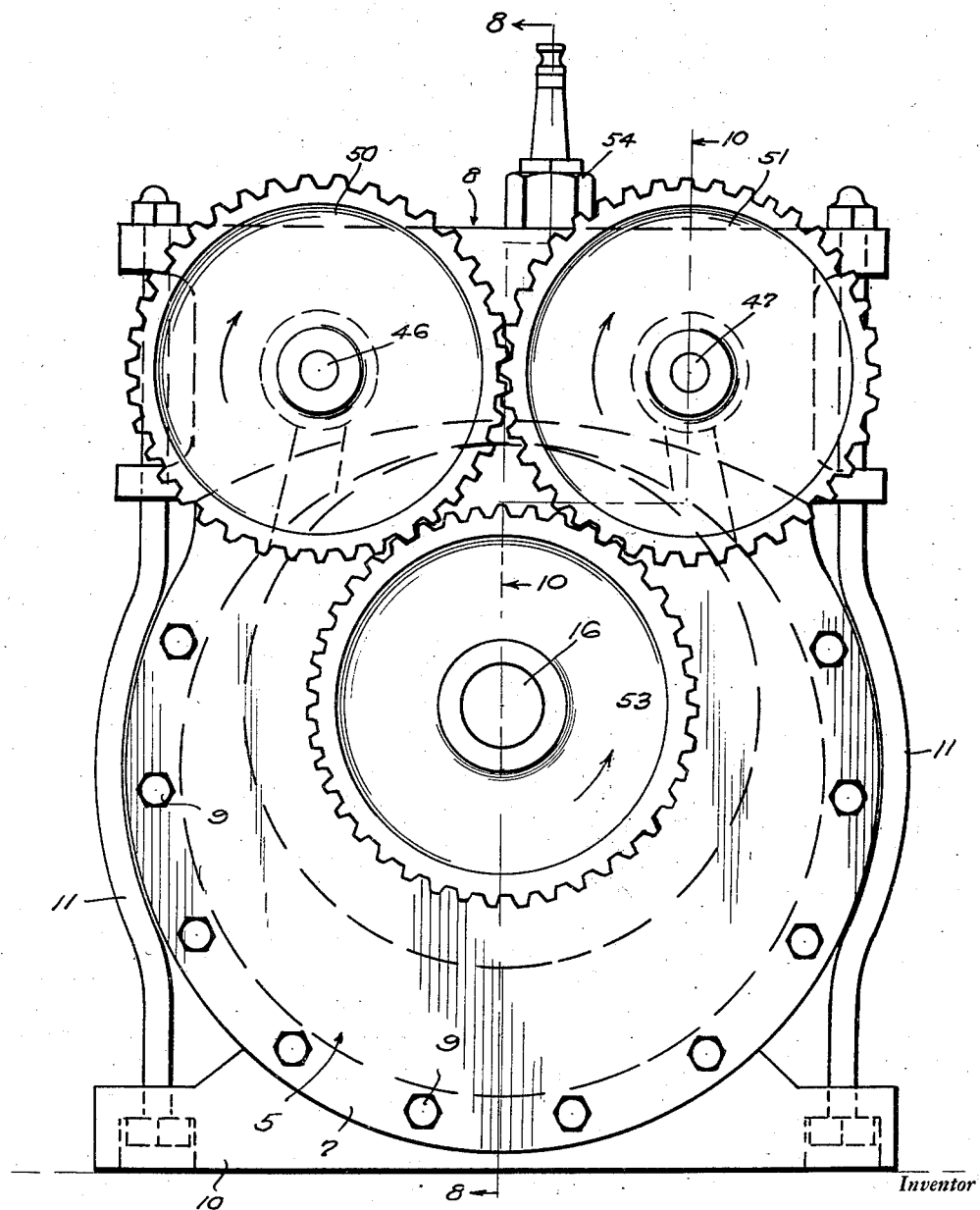
Figure 1 is a side elevational view of a rotary combustion engine constructed in accordance with the present invention.

Referring in detail to the drawings, the present engine includes a housing or casing 5 that is composed of an intermediate section 6, removable end sections 7 and 7a, and a removable head 8. The sections 6, 7 and 7a are bolted together, as at 9, and are provided with base portions 10. Bolts 11 extend through flanges of the base portions 10 and the head 8 to rigidly secure the latter in assembled relation to the sections 6, 7 and 7a. The head 8 may be divided vertically to correspond with the sections 6, 7 and 7a, as shown.

The inner face of the end section 7a is recessed in a manner to provide an off-center spindle 12 in this end of the housing and projecting from the spindle 12 is an arm 13 which carries a pivot pin 14 located centrally in the housing. Mounted eccentrically in the housing is a rotary piston 15 which is fixed on one end of a shaft 16 journaled in an off-center bearing 17 which is provided therefor in the end section 7 of the housing 5. On the end thereof which is remote from the shaft 16, the piston 15 includes the outer race 18 of a bearing whose inner race 19 is mounted on the spindle 12.

At diametrically opposite sides, the piston 15 has internal pockets 20 and transverse elongated slots 21 at the outer sides of said pockets. Cylindrical oscillating bearings 22 are journaled in the pockets 20 and are provided with diametric slots 23 through which radial vanes 24 slidably extend. Beveled retaining strips 25 removably retain the bearings 22 in place and are in turn held in place by retaining strips 26 bolted to the piston, as at 27. Centrifugally projected sealing strips 28 are slidably mounted in grooves of the piston 15 at opposite sides of the outer portions of the bearings 22, and lubricant conducting passages 29 are provided which lead from the interior of the piston 15 to the surfaces of the bearings 22 at opposite sides of the latter. Thus, the bearings 22 may be effectively lubricated and the sealing strips 28 will retain the lubricant against passage outwardly through the slots 21 into the crescent-shaped power and pump chamber 30 provided between the housing and the piston 15. The inner ends of the vanes 24 are pivoted at 31 on the pivot pin 14. The side edges of the vanes 24 have longitudinal lubricant grooves 32 that are arranged between the leg portions of U-shaped grooves 33 in which are disposed similarly shaped packing strips 34 that prevent leakage past the sides of the vanes. A further sealing strip 35 is arranged in a groove 36 provided in the outer edge of each vane 24 to prevent passage of gases past the outer edges of said vanes.

Figure 6:
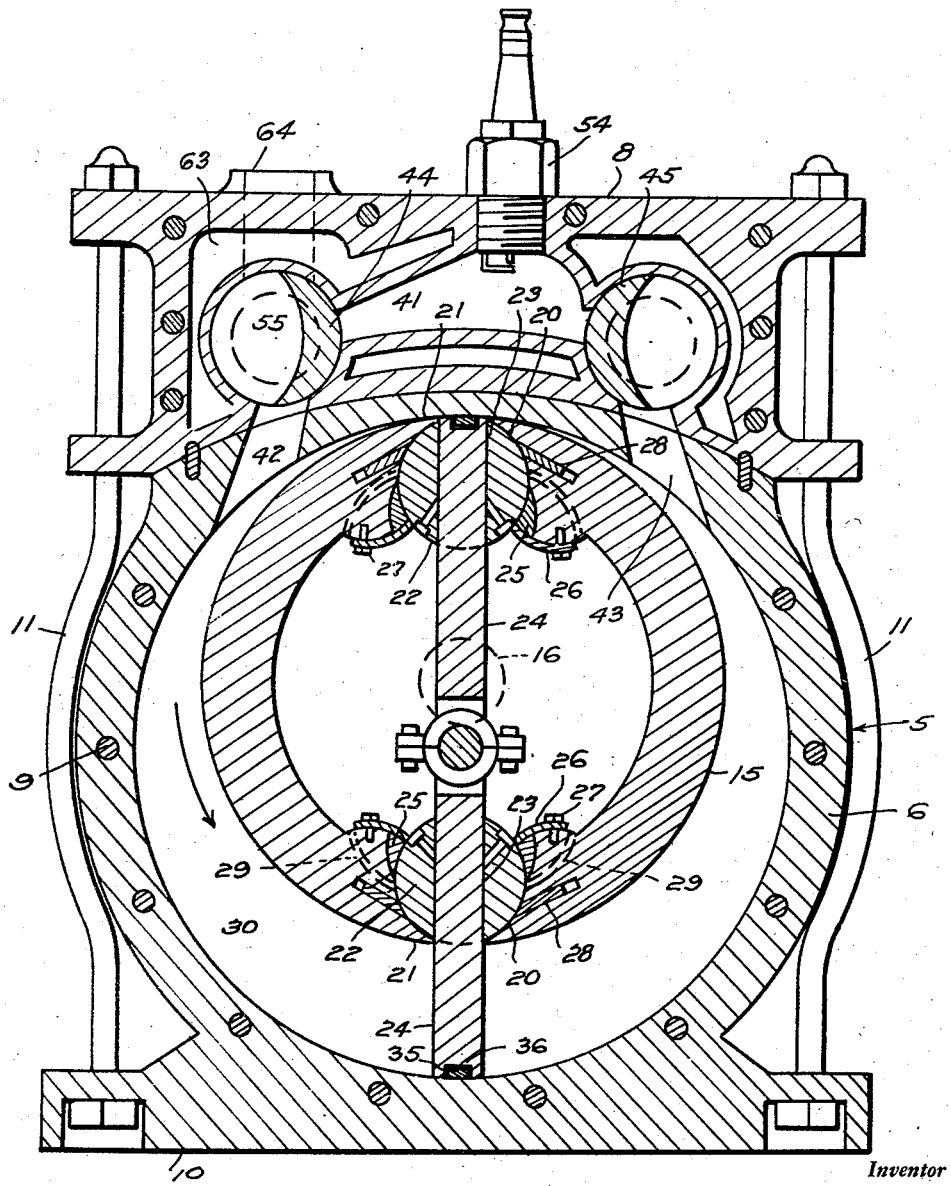
Figure 6 is a vertical section taken on line 6—6 of Figure 2, and drawn on an enlarged scale.

The chamber 30 receives explosive charges from a carburetor 37 and intake pipe 38 through an intake port 39, and the spent gases escape from the chamber 30 through an exhaust port 40 to the exhaust pipe 41'. Formed in the head 8 is a combustion chamber 41 which communicates with the chamber 30 through a port 42 at one side and a port 43 at the other side. The ports 39 and 42 are controlled by a rotary valve 44, while the ports 40 and 43 are controlled by another similar rotary valve 45 journaled in suitable chambers of the head 8 at opposite sides of the combustion chamber 41. The valves 44 and 45 preferably taper slightly from the ends adjacent the intake and exhaust pipes 38 and 41' to the other ends thereof, and the latter ends are provided with projecting drive shafts 46 and 47, respectively. The chambers for the valves 44 and 45 taper similarly to the valves, and the latter are maintained in snug engagement with the walls of their respective chambers by means of adjustable bushings 48 through which the shafts 46 and 47 extend. The bushings 48 are threaded in sleeves 49 fitted and secured in the adjacent ends of the valve chambers, the outer ends of the bushings 48 engaging the inner sides of gears 50 and 51 secured on the shafts 46 and 47. By adjusting the bushings 48 outwardly, they draw the valves to the left of Figure 10 so as to bring about the snug engagement of the valves in their chambers as stated above. The adjustment of bushings 48 is secured by lock nuts 52 threaded on said bushings outwardly of the sleeves 49. Gears 50 and 51 are similar in size to a further gear 53 secured on the drive shaft 16 and mesh with said gear 53. Thus, the valves 44 and 45 are driven from the drive shaft 16 at the same speed as the latter. The explosive charges admitted to chamber 41 may be ignited at the proper times by ignition means including a spark plug 54 threaded into the head 8 and projecting into chamber 41, as shown in Figure 6. Each of the valves 44 and 45 has peripheral packing rings 55' to prevent leakage between the valves and the walls of their chambers. The valves 44 and 45 have peripheral recesses 55 and 56 to respectively afford periodic communication between chamber 41 and port 42 and between port 43 and chamber 41, respectively. Similar recesses are provided in the opposite sides of the valves 44 and 45, as at 57 and 58, adjacent the ports 39 and 40, respectively. The ends of the valves 44 and 45 adjacent the recesses 57 and 58 are hollow or provided with axial passages, as at 59, to respectively afford communication between recess 57 and intake pipe 38 and between recess 58 and exhaust pipe 41'.

Further split packing rings 60 are provided on the end portions of piston 15 to prevent lateral leakage between the periphery of the piston and the inner peripheral wall of chamber 30. These rings 60 preferably have locating pins 61 thereon which project into sockets 62 provided in the piston 15, as shown more clearly in Figure 9. Similar packing rings or strips are provided at such other points where leakage may otherwise occur.

Figure 7:
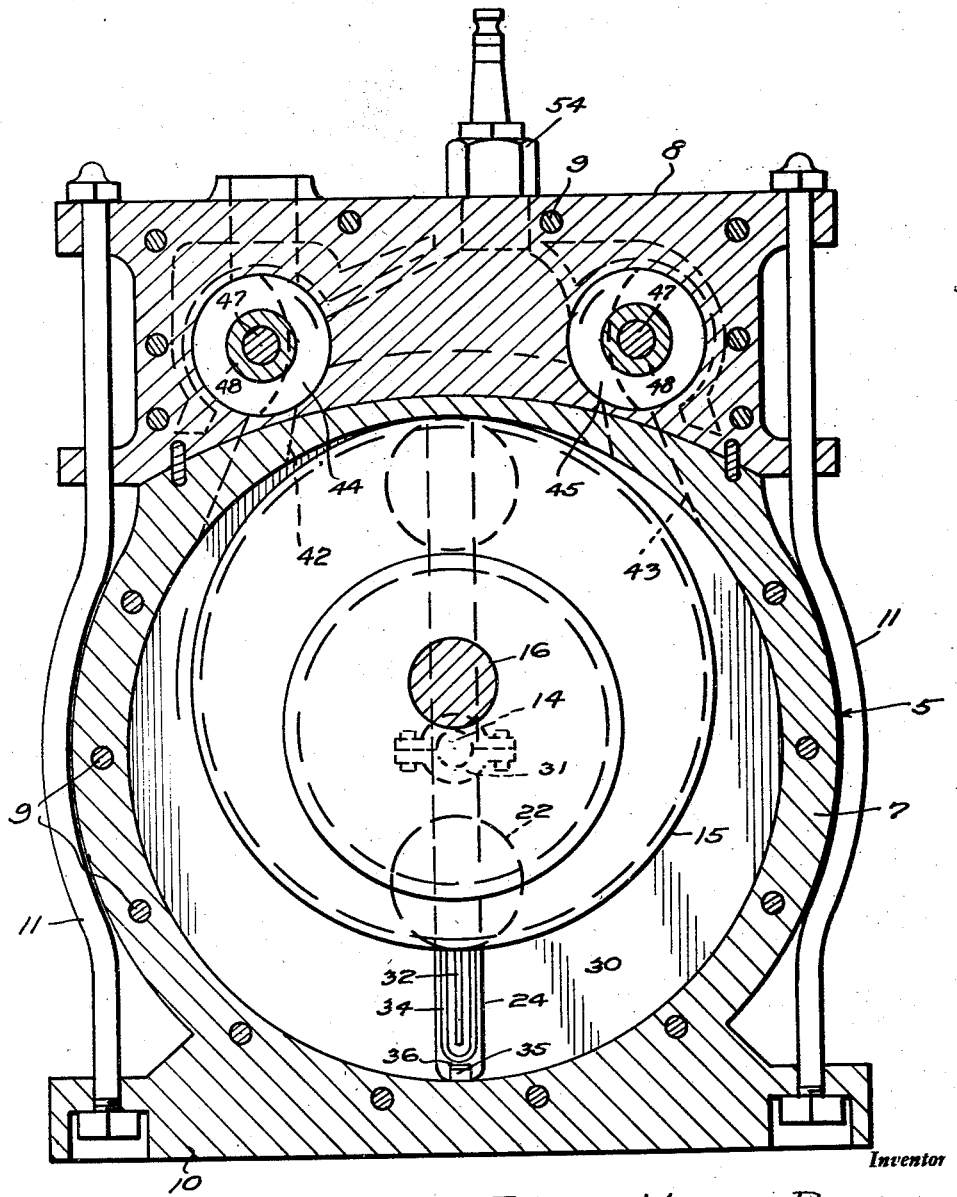
Figure 7 is a view similar to Figure 6 taken on line 7—7 of Figure 2.

In operation, the eccentrically mounted piston 15 rotates in an anti-clockwise direction, as indicated by the arrows in Figures 6 and 7, and the valve 44 opens to admit an explosive charge from intake pipe 38 into chamber 30 through port 39 in advance of one of the vanes 24. As the piston continues to rotate, the explosive charge is compressed ahead of the vane mentioned and then the valve 45 opens to permit passage of the compressed charge into combustion chamber 41 by way of port 43. The compressed charge is then fired in the combustion chamber 41, whereupon valve 44 will have turned to a position for permitting the exploded charge to pass from chamber 41 into chamber 30 behind the succeeding vane 24, thereby driving the piston 15. When the latter piston passes the port 40, the valve 45 turns to a position for permitting the spent gases to pass outwardly through said port 40 to the exhaust pipe 41'. This cycle of operation is repeated in rapid succession so that the piston 15 and shaft 16 are continuously driven. The numeral 63 merely indicates a water jacket or space in the head 8 and the numeral 64 indicates a connection by which cooling water may be supplied to said water space or jacket. Of course, there will be provided a second connection for passage of the water from the jacket as is common in the cooling systems of internal combustion engines.

From the foregoing description, it is believed that the construction and operation, as well as the advantages of the present invention, will be readily understood and appreciated by those skilled in the art. It will be particularly noted that the construction is extremely simple, compact and efficient. Movable parts likely to get out of order are reduced to a minimum, and the rotary valves are employed in a manner to greatly simplify prior constructions making use of poppet valves or the like. The vanes 24 are mounted and connected so as to readily assume angular relative positions while sliding through the piston, and efficient provision is made for lubrication of the vanes and their bearings 22, as well as for removable retention of said bearings 22 in place. Minor changes may be made in details of construction illustrated and described, such as fall within the spirit and scope of the invention as claimed.

What I claim is:

A rotary combustion engine comprising a circular housing, an eccentric piston rotatable in the housing, vanes slidable radially in the piston and operable in the housing, a head mounted on the housing, said head having a combustion chamber therein, fuel intake and exhaust passages in the head communicating with the housing, rotary fuel intake and exhaust valves mounted in the head at opposite sides of said combustion chamber and respectively controlling communication between the intake passage and the housing and between the exhaust passage and the housing, said valves further respectively controlling communication between opposite sides of the combustion chamber and the housing so as to admit explosive charges into the housing, compress them in the housing, deliver the compressed charges to the combustion chamber, deliver the fired compressed gases from the combustion chamber to the housing, and deliver the spent gases from the housing to the exhaust passage, means for firing the explosive charges in said combustion chamber, and driving means for continuously rotating the valves in the same direction at piston speed comprising a gear rotatable with the piston and inter-meshing gears rotatable with said valves and meshing with the gear of the piston.

EVERETT WILLIAM RICH.